W. E. SIDNEY.
GEARLESS DRIVING MECHANISM.
APPLICATION FILED JAN. 22, 1915.
1,205,115.
Patented Nov. 14, 1916.
3 SHEETS—SHEET 1.
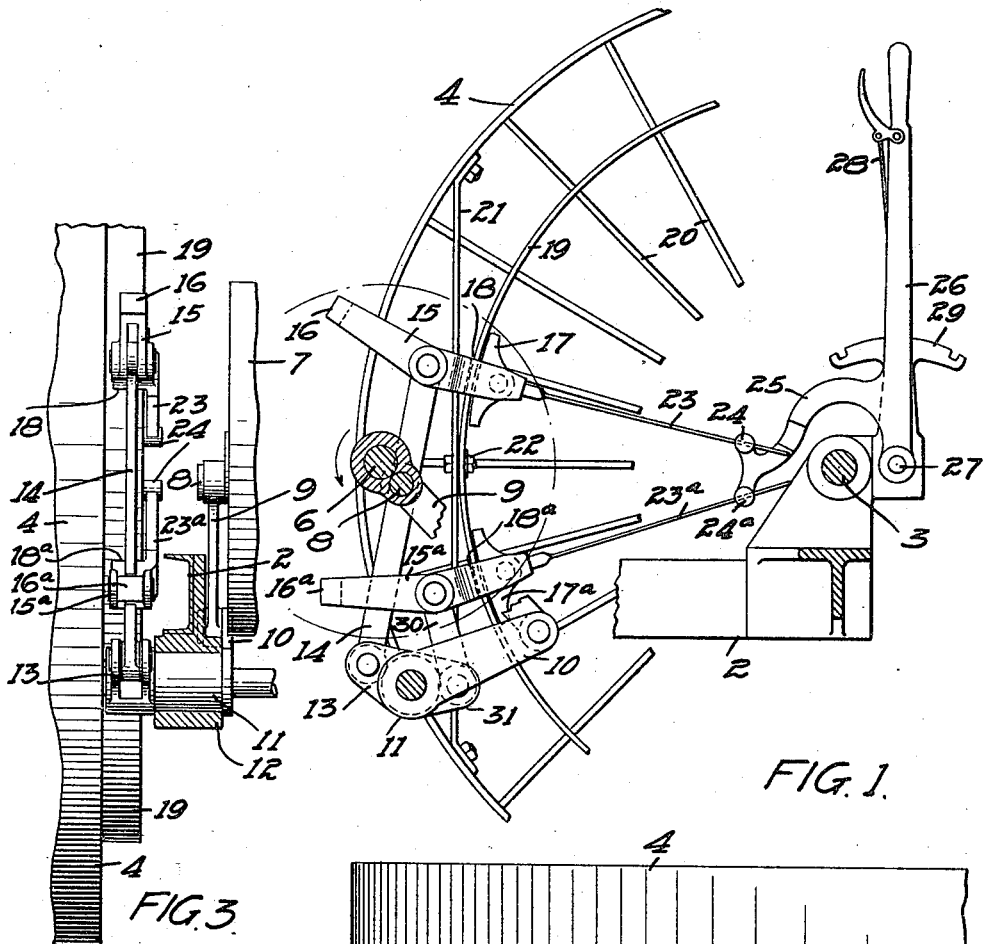
FIG. 1.
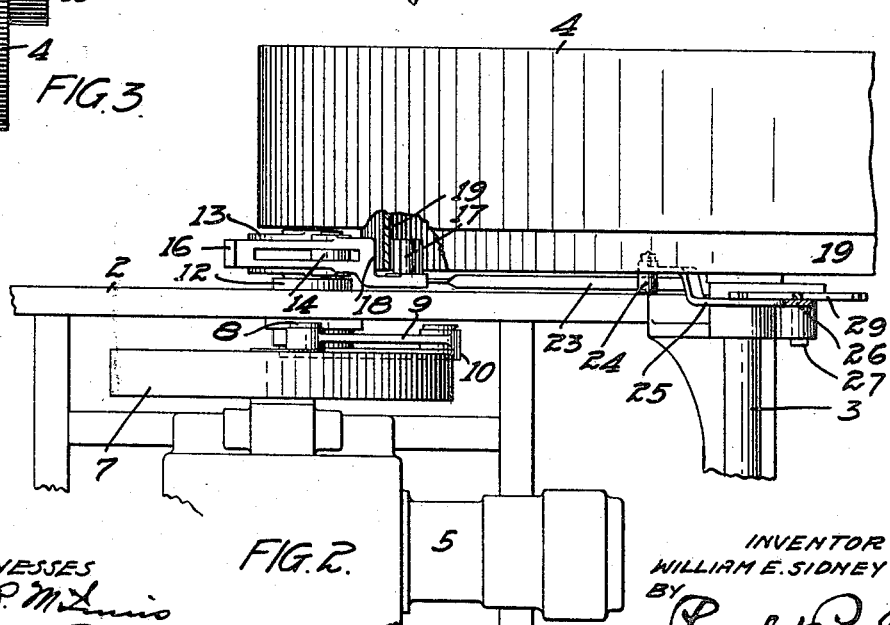
FIG. 3.
FIG. 2.
WITNESSES
INVENTOR
WILLIAM E. SIDNEY
BY
ATTORNEYS

W. E. SIDNEY.
GEARLESS DRIVING MECHANISM.
APPLICATION FILED JAN. 22, 1915.

1,205,115.

Patented Nov. 14, 1916.
3 SHEETS—SHEET 2.

WITNESSES
M. R. McAnnis
E. A. Paul

INVENTOR
WILLIAM E. SIDNEY
BY
Paul & Paul
ATTORNEYS

UNITED STATES PATENT OFFICE.

WILLIAM E. SIDNEY, OF MINNEAPOLIS, MINNESOTA, ASSIGNOR OF ONE-HALF TO UNION IRON WORKS, OF MINNEAPOLIS, MINNESOTA, A CORPORATION.

GEARLESS DRIVING MECHANISM.

1,205,115.     Specification of Letters Patent.     Patented Nov. 14, 1916.

Application filed January 22, 1915. Serial No. 3,752.

*To all whom it may concern:*

Be it known that I, WILLIAM E. SIDNEY, citizen of the United States, resident of Minneapolis, county of Hennepin, State of Minnesota, have invented certain new and useful Improvements in Gearless Driving Mechanisms, of which the following is a specification.

The object of my invention is to provide a driving mechanism capable of adaptation for various purposes but particularly applicable to traction machines or vehicles.

A further object is to provide a driving mechanism of simple construction and one which can be applied for driving purposes, quickly adapted for forward and reverse movement.

A further object is to provide a driving mechanism in which the wear and breakage incidental to a gear drive and resulting from the accumulation of dust and dirt therein will be avoided.

Other objects of the invention will appear from the following detailed description.

The invention consists generally in various constructions and combinations, all as hereinafter described and particularly pointed out in the claims.

Figure 4:
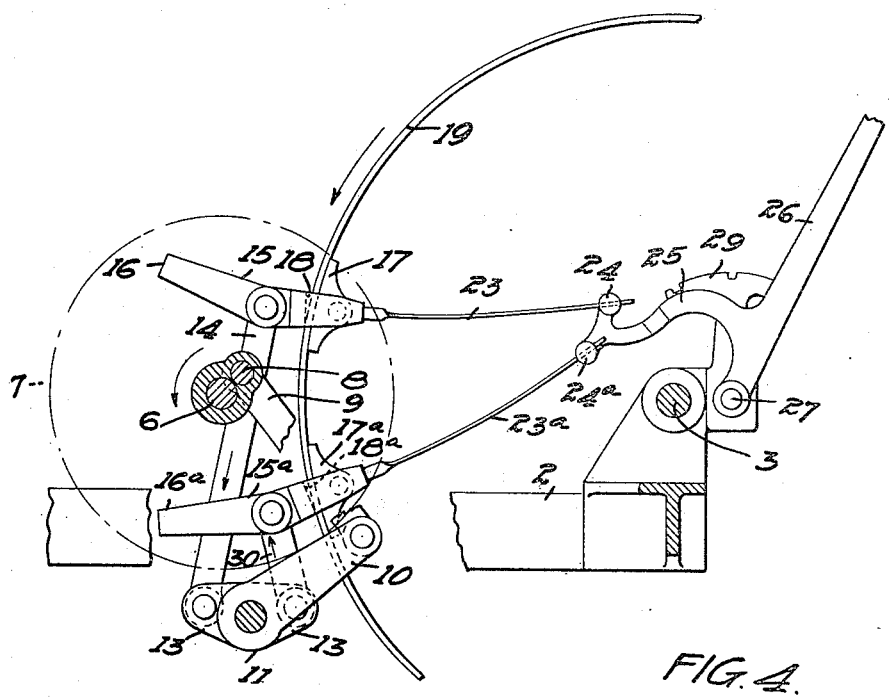
Figure 5:
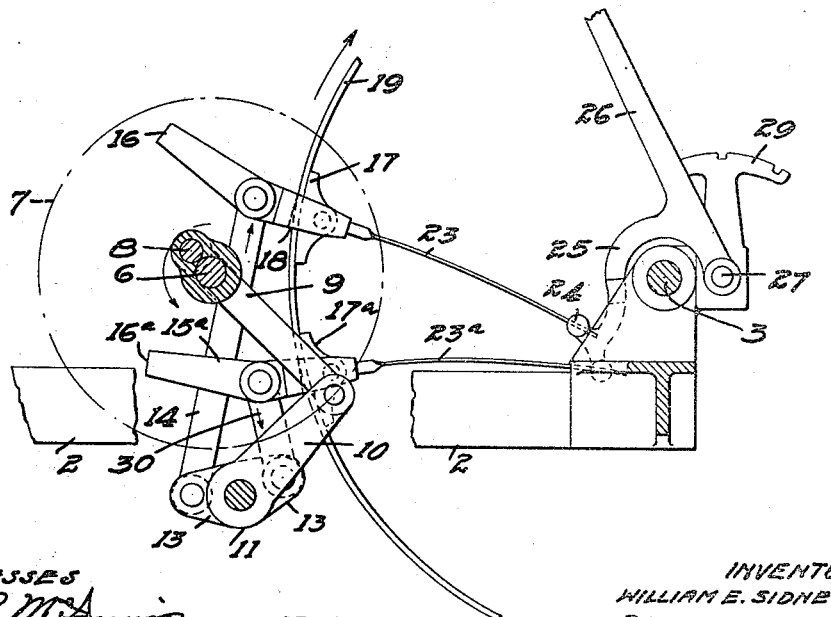
Figure 6:
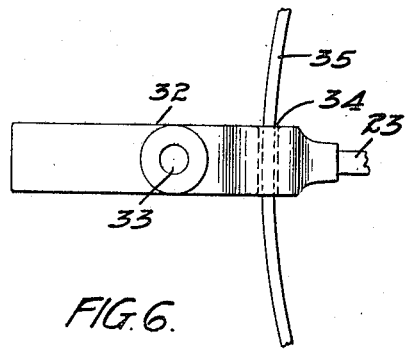
Figure 8:
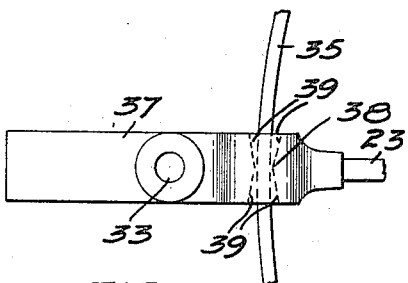
Figure 7:
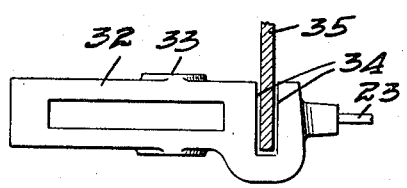
Figure 9:
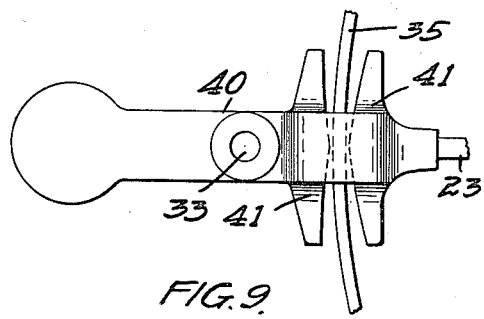
Figure 10:
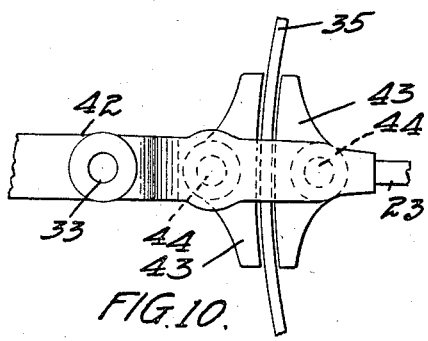
Figure 12:
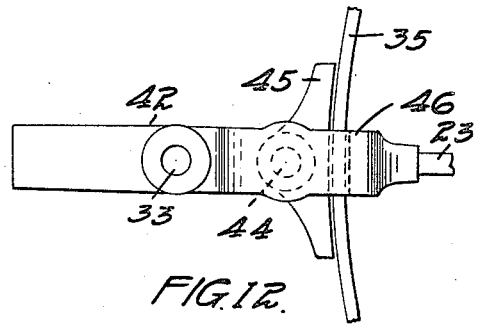
Figure 11:
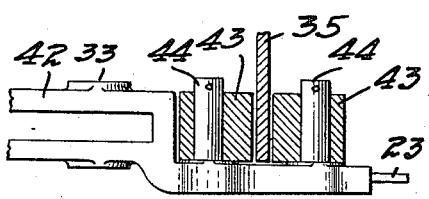
Figure 13:
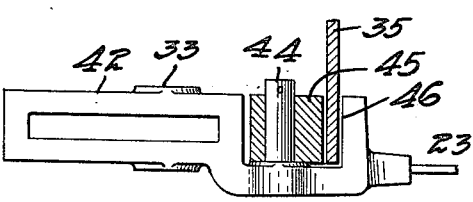

In the accompanying drawings forming part of this specification, Figure 1 is a detail view, illustrating the application of my invention to a traction wheel, the mechanism being set for its inactive or neutral position, Fig. 2 is a plan view of the same, Fig. 3 is a front view, partially in section, Fig. 4 is a detail sectional view, illustrating the mechanism set for driving forward, Fig. 5 is a similar view, with the driving mechanism set for reverse movement, Fig. 6 is a detail view, illustrating the gripping or clamping parts involved in the device, Fig. 7 is a plan view of the same, Fig. 8 is a detail view, illustrating a modified construction of the shoe, Fig. 9 is a similar view, showing the shoes with a longer bearing surface, Fig. 10 is a detail view of a modified construction of the clamping shoes, Fig. 11 is a plan sectional view of the same, Fig. 12 is still another modified construction, Fig. 13 is a plan sectional view of Fig. 12.

In the drawing, 2 represents a portion of the frame of the machine or vehicle, to which the driving mechanism is applied, and 3 the axle of a carrying or traction wheel 4. This wheel has the usual wide tread traction rim, loosely mounted on the axle, the wheel on the other side of the machine, (not shown) being arranged in a similar manner.

My invention may be applied to one traction wheel or to several of them, if preferred.

5 represents a suitable source of power, mounted on the machine frame, usually consisting of an internal combustion engine having a shaft 6 and a fly wheel 7 mounted thereon. A crank pin 8 is mounted on said fly wheel and is connected by a link 9 with an arm 10 that is mounted on one end of a rocker 11 journaled in bearings 12 on the machine frame. The other end of the rocker is provided with a fork 13 and a link 14 pivotally connects this fork with a carrier 15. This carrier is provided at its outer end with a counter weight 16 and at its inner end with a pivoted traction shoe 17 and between said traction shoe and the pivot of the link 14 is a traction surface 18 opposing the surface of the shoe 17. A sufficient space is provided between the face of the shoe and the gripping surface to receive the rim of the wheel, but in this particular instance I prefer to provide a secondary rim or band 19 concentric with the rim proper and held in place by spokes 20 and other suitable means, such as the brace bar 21 and bolts 22. The shoe 17 is pivotally supported in the inner end of the carrier 15 and a spring 23, preferably of flattened steel, is mounted at one end in the end of the carrier and has a sliding bearing at its other end in a pin 24 mounted on an arm 25 which projects outwardly from a lever 26 that is pivoted at 27 and has a latch 28 to engage the notches of a quadrant 29. A second carrier, which I will designate by the same numeral as the first one, with the addition of the exponent "a," has a link 30 pivotally connecting its middle portion with a fork 31 carried by the rocker 11, so that the link 14 and the link 30 will be positively actuated with the movement of the rocker 11. A carrier 15[a] has a shoe which I will designate by reference numeral 17[a] and a friction surface 18[a], a counter balance 16[a] and the shoe 17[a] has a similar spring 23[a] connecting it with the arm 25 of the operating lever. It will be understood that the pitman 9 operates continuously through its connection with the engine fly wheel. When the lever is set in the neutral position, as shown in Fig. 1, the springs 23 and 23ᵃ will be inactive or neutral and the clutches or clamping means, consisting of the pivoted shoes and the fixed clamping surfaces 18 and 18ᵃ, will also be inactive and the shoes out of contact with the friction band or supplementary rim 19. When, however, the control lever is thrown to the position indicated in Fig. 4, the springs will be put under tension, as indicated, tilting the balanced carriers on their pivots to bring one edge of each friction surface against the outer surface of the rim 19, while the pivoted shoes are seated against the inner surface of the rim and at the same time, through the movement of the rocker 11, movement will be imparted to the links 14 and 30 to alternately pull on the carriers 15 and 15ᵃ and revolve the wheel step by step, the gripping devices operating alternately so that the movement is continuous.

As plainly indicated in Fig. 4, the throwing of the control lever to the backward position will tilt the balanced carriers so that the lower edges of the fixed gripping surfaces will engage the rim or band 19 and clamp it between them and the shoes, so that the revolution of the fly wheel and the reciprocation of the pitman will operate to revolve the traction wheel for forward movement. To reverse, the control lever is thrown to the position indicated in Fig. 5, causing the springs to be oppositely flexed and tilting the carriers in the opposite direction to engage their upper edges with the rim and effect a reverse movement of the traction wheel. When the lever is moved to the intermediate position, as indicated in Fig. 1, the friction shoes will be inactive and the engine may be operated without moving the machine. The driver will have immediate control over the operating mechanism and can easily and quickly shift the control lever for forward or reverse movement. The transmission gears between the engine and the traction wheels usually incidental to machines of this character are entirely eliminated and thereby considerable expense is saved in the construction and operation of the machine. Aside from the cost of gearing, it has been found that dust and dirt will collect in the transmission and not only greatly increase the friction but lessen the life of the gearing. This objection in the mechanism I have shown and described is entirely eliminated.

In Fig. 6 I have illustrated the essential principle of the gripping mechanism embodied in a carrier 32 having a pivotal connection for a pitman at 33 in such a manner as to be balanced thereon and provided at one end with a transverse slot 34 forming stationary jaws to engage with the inner and outer surfaces of the wheel band or rim, or other device to be revolved. The slot 34 is sufficiently wide to provide clearance for the band 35 and allow the carrier to be rocked in either direction to a tangential position with respect to the surface of the band or rim and provide for locking engagement with the band at the extremities of the rocking movement of the carrier. This slotted carrier forms, in effect, a dog which, when tilted by the movement of the pitman, as described with reference to the previous figures, will be held in its tilted, gripping position by the tenson of the spring connecting the carrier or dog with the control mechanism, as shown in Fig. 1, the spring keeping both friction surfaces in continuous contact with the wheel band or rim. The principle involved in this device in transmitting power to the wheel is identical with the action obtained through the placing of the jaws of a monkey wrench on the wheel band and tilting it until the edge of one jaw engages one face of the band and the diagonally opposite edge of the other jaw engages the other surface of the band, so that when pressure is applied to the handle of the wrench, power will be transmitted through the jaws to revolve the wheel or other mechanism to which it may be applied.

In Fig. 7 I have shown a plan sectional view of the carrier of Fig. 6.

In Fig. 8 a carrier or dog 37 is shown, having jaws 38 provided with oppositely inclined gripping surfaces 39 to allow the carrier to rock on the rim and permit the opposing inclined surfaces on one side of the center to engage the rim for movement of the wheel in one direction and the surface on the opposite side of the center to engage the rim when the carrier is tilted the other way for movement of the machine in the other direction. Another carrier, or any suitable number of them, may be connected with the carrier 37 or with the carrier 32, the principle of operation of the two carriers being substantially the same, said carriers operating alternately to grip and release the rim and transmit power from the engine to the traction wheels.

In Fig. 9 a slightly modified form of carrier 40 is shown, having jaws 41 that have comparatively long faces for gripping the rim.

In Fig. 10 the carrier 42 is shown provided with shoes having curved gripping surfaces pivotally supported on pins 44, both shoes being mounted to rock with the movement of the carrier as the pitman reciprocates to engage with and release the wheel band or rim.

In Fig. 12 a similar form of carrier is shown, having a pivoted jaw 45 and a stationary jaw 46 between which the band is clamped and held. In all these types the flexible means between the carrier and the operating lever will be substantially the same and will perform substantially the same function as the device provided for this purpose in the previous figures.

It will be understood that this apparatus is applicable to any type of traction vehicle and may also be used in other mechanisms where it is desirable to eliminate the transmission gearing.

I do not wish to be confined to the form of control lever or the manner of connecting it to the drive mechanism, or to the details of construction of the drive, as in various ways these features may be modified and still be within the scope of my invention.

I claim as my invention:

1. The combination, with a frame and a source of motive power thereon, of a wheel, friction members having gripping surfaces to engage and clamp said wheel at opposing points on inner and outer faces of the wheel, operative connections between said members and said source of motive power for alternate operation of said members to grip and release said wheel to rotate it, and mechanically operated yielding means for positively shifting said members for forward or reverse movement of said wheel and holding them to their changed positions.

2. The combination, with a revolving member having a friction surface, of gripping members having jaws for engaging said friction surface, pitmen pivotally connected with said gripping members for forward and backward movement on said friction surface, and mechanically operated yielding means for positively tilting said gripping members to a position at a tangent to said friction surface, whereby the movement of said pitmen will be imparted through said gripping members to operate said revolving means.

3. In combination, with a revolving member having a friction surface, gripping members having jaws disposed to engage said friction surface at opposing points on inner and outer faces of the revolving member, means for tilting said gripping members to operatively engage their jaws with said friction surface, pitmen connected with said gripping members for forward and backward movement thereof in alternation on said friction surface.

4. The combination, with a frame and a source of motive power mounted thereon, of a loosely mounted traction wheel provided with a friction surface, tilting grippers for engaging said friction surface at opposing points on inner and outer faces thereof, means operatively connecting said grippers with said source of motive power for alternate movement of said grippers, and mechanically actuated spring arms for swinging said grippers to engage their forward or rear edges with said friction surface for forward or reverse movement of said wheel.

5. The combination, with a frame and a source of motive power mounted thereon, of a loosely mounted traction wheel having a frictional surface, tilting grippers for engaging said surface, means operatively connecting said grippers with said source of motive power for alternately sliding and clamping said grippers on said surface, and a control lever and spring arms connecting it with said grippers, said arms being put under tension by the movement of said lever to hold said grippers in their clamping position.

6. In combination, with a traction wheel having a clamping surface, a source of motive power, grippers having pivoted shoes and surfaces opposing said shoes between which the friction surface of said wheel is clamped and held, counter-weighted carriers wherein said grippers are mounted to tilt and clamp or release said friction surface, means operatively connecting said grippers with said source of motive power for sliding said grippers on said surface, and means for tilting said grippers to adjust them for their clamping or neutral position.

7. In combination, with a traction wheel having a friction surface, a source of motive power, grippers having clamping surfaces to engage the surface of said wheel, means operatively connecting said grippers with said source of motive power, a control lever, springs mounted in said grippers and having bearings in said control lever, said springs being capable of being flexed by the movement of said lever to hold said grippers in their active gripping position for forward or reverse movement of said wheel, said springs and lever when in their neutral position, holding said grippers out of engagement with said friction surface.

8. In combination with a traction wheel having a friction surface, a source of motive power, grippers having clamping surfaces to engage the surface of said wheel on inner and outer faces thereof, means connecting said grippers with said source of motive power for application of driving power through the grippers, in alternation, to the traction wheel, a control lever, and means connecting it with said grippers, said means being put under tension by the movement of said lever and tilting said grippers to engage or release said friction surface.

In witness whereof, I have hereunto set my hand this 9th day of January 1915.

WILLIAM E. SIDNEY.

Witnesses:
GENEVIEVE E. SORENSEN,
EDWARD A. PAUL.